US009002307B2

(12) United States Patent
Luhtala

(10) Patent No.: US 9,002,307 B2
(45) Date of Patent: Apr. 7, 2015

(54) RADIO BROADCAST RECEPTION

(75) Inventor: Harri Petteri Luhtala, Oulu (FI)

(73) Assignee: Nokia Corporation, Espoo (FI)

( * ) Notice: Subject to any disclaimer, the term of this patent is extended or adjusted under 35 U.S.C. 154(b) by 44 days.

(21) Appl. No.: 14/003,320

(22) PCT Filed: Mar. 8, 2011

(86) PCT No.: PCT/IB2011/050970
§ 371 (c)(1),
(2), (4) Date: Sep. 5, 2013

(87) PCT Pub. No.: WO2012/120334
PCT Pub. Date: Sep. 13, 2012

(65) Prior Publication Data
US 2013/0344832 A1    Dec. 26, 2013

(51) Int. Cl.
*H04B 1/06* (2006.01)
*H04B 7/00* (2006.01)
*H04H 60/51* (2008.01)
*H04H 60/74* (2008.01)

(52) U.S. Cl.
CPC .................. *H04B 1/06* (2013.01); *H04H 60/74* (2013.01); *H04H 60/51* (2013.01); *H04H 2201/13* (2013.01)

(58) Field of Classification Search
CPC ............ H04B 1/06; H04B 7/00; H04H 60/51; H04H 60/74; H04H 2201/13; H03J 1/0058; H03J 1/00
USPC ............ 455/230, 186, 1, 185.1, 161.1, 166.1, 455/412.1, 414.1, 414.2, 414.3, 154.2, 455/158.1, 224, 184.1
See application file for complete search history.

(56) References Cited

U.S. PATENT DOCUMENTS

| | | | |
|---|---|---|---|
| 5,303,401 A * | 4/1994 | Duckeck et al. | 455/186.1 |
| 5,393,713 A | 2/1995 | Schwob | |
| 5,732,338 A * | 3/1998 | Schwob | 455/158.5 |
| 5,898,910 A | 4/1999 | Miyake et al. | |
| 6,181,921 B1 * | 1/2001 | Konisi et al. | 455/186.2 |
| 6,697,631 B1 * | 2/2004 | Okamoto | 455/457 |
| RE38,600 E * | 9/2004 | Mankovitz | 348/473 |

(Continued)

FOREIGN PATENT DOCUMENTS

| | | |
|---|---|---|
| WO | 2005062507 A1 | 7/2005 |
| WO | WO2005062507 | 7/2005 |

(Continued)

OTHER PUBLICATIONS

PCT International Preliminary Report on Patentability for Int. App. No. PCT/IB2011/050970—8 pages.

(Continued)

*Primary Examiner* — Pablo Tran
(74) *Attorney, Agent, or Firm* — Locke Lord LLP

(57) ABSTRACT

Apparatus comprises means for storing a table including plural program identification codes and, for each program identification code, a corresponding program name; means for extracting a program identification code from supplementary information received along with a radio broadcast; means for searching the table for the decoded program identification code; means for reading from the table a program name that corresponds to the program identification code; and means for causing the program name to be displayed.

19 Claims, 4 Drawing Sheets

(56) References Cited

U.S. PATENT DOCUMENTS

| | | | |
|---|---|---|---|
| 7,251,452 B2* | 7/2007 | Stumphauzer, II | 455/3.06 |
| 7,502,589 B2* | 3/2009 | Howard et al. | 455/3.06 |
| 7,606,327 B2* | 10/2009 | Walker et al. | 375/316 |
| 7,912,421 B2* | 3/2011 | Olgen | 455/3.06 |
| 8,103,208 B2* | 1/2012 | Cho et al. | 455/3.01 |
| 8,136,137 B2* | 3/2012 | Kim | 725/62 |
| 8,391,775 B2* | 3/2013 | Moinzadeh et al. | 455/3.06 |
| RE44,566 E* | 10/2013 | Goldberg et al. | 463/42 |
| 8,676,135 B2* | 3/2014 | Hong et al. | 455/99 |
| 2004/0110522 A1* | 6/2004 | Howard et al. | 455/512 |
| 2004/0198279 A1* | 10/2004 | Anttila et al. | 455/179.1 |
| 2006/0067260 A1* | 3/2006 | Tokkonen et al. | 370/310 |
| 2011/0029237 A1 | 2/2011 | Kamalski | |
| 2011/0076971 A1 | 3/2011 | Nakata | |

FOREIGN PATENT DOCUMENTS

| | | |
|---|---|---|
| WO | 2010001521 A1 | 1/2010 |
| WO | WO2010001521 | 1/2010 |

OTHER PUBLICATIONS

International Search Report and Written Opinion received for corresponding Patent Cooperation Treaty Application No. PCT/IB2011/050970, dated Nov. 9, 2011, 12 pages.

* cited by examiner

RADIO BROADCAST RECEPTION

RELATED APPLICATION

This application was originally filed as Patent Cooperation Treaty Application No. PCT/IB2011/050970 filed Mar. 8, 2011.

FIELD OF THE INVENTION

The present specification relates to the field of radio broadcast reception.

BACKGROUND TO THE INVENTION

The radio data system (RDS) is intended for application to VHF/FM audio broadcasts in the range 87.5 MHz to 108 MHz; these may carry either stereophonic or monophonic programs. The main objectives of RDS are to enable improved functionality of FM receivers and to make them more user friendly. This is achieved through the use of features such as program service (PS) name, program type (PTY) and, where applicable, automatic tuning for radios incorporated into mobile devices.

RDS is defined by the European Broadcasting Union (EBU)/Cenelec Standard EN50067: 1998, "Specification of the Radio Data System". This standard is compatible with the United States radio broadcast data system defined by their National Radio Systems Committee in the specification of the Radio Broadcast Data System, dated 9 Apr. 1998. In the following, it should be understood that the term RDS refers to both the Radio Data System and the Radio Data Broadcasting System (RDBS).

FIG. 1 shows the structure of the baseband coding of the RDS standards.

The largest element in the structure is called a group, consisting of 104 bits. Each group contains four blocks of 26 bits each. Each block contains an information word and a check word. Each information word comprises 16 bits, and each check word comprises 10 bits.

Each group contains message information; the message format and addressing structure are shown in FIG. 2. The first block in every group always contains a program identification (PI) code. The first four bits of the second block of every group are allocated to a 4-bit code that specifies how the information within the group is to be applied. Groups will be referred to as type 0 to 15 according to binary weighting A3=8, A2=4, AI=2, Ao=1. For each type (0 to 15) two versions can be defined. The version is specified by a fifth bit (Bo) of block 2. a) Bo=0: the PI code is inserted in block 1 only. This defines version A of the RDS encoding systems. b) Bo=1: the PI code is inserted in block 1 and block 3 of all group types.

This defines version B of the RDS encoding systems.

Each block contains a Group Type Code (GTC) defining the nature of the information word of the block.

A mixture of version A and version B groups may be transmitted on one particular FM radio station. A program type code (PTY) and the traffic program identification (TP) occupy six locations in block 2 of every group.

The PI, PTY and TP codes can be decoded without reference to any block outside the ones that contain information relating to one of these codes. This is important to minimise acquisition time for these kinds of message and to retain the advantages of the short (26-bit) block length. To permit this to be done for the PI codes in block 3 of version B groups, a special offset word (commonly defined as C') is used in block 3 of version B groups. The occurrence of offset C' in block 3 of any group can then be used to indicate directly that block 3 is a PI code, without any reference to the value of Bo in block 2.

Repetition rates of some of the main features of RDS are defined in the standard. A total of four type OA groups are required to transmit an entire program service (PS) name, and therefore four type OA groups are required per second according to the standard. The repetition rate of the type OA group may be reduced if more capacity is needed for other applications. A minimum of two type OA groups per second is necessary to ensure correct functioning of PS and alternative frequency (AF) features.

Circuits for receiving and decoding both audio and data components of an FM radio broadcast are known in the art. Indeed, an example of an FM receiver demodulator having an RDS demodulator and decoder is given in the radio broadcast data system standard.

Mobile devices, for example mobile phones, smartphones and car stereos, incorporating FM radio receivers require occasional or sometimes frequent retuning due to spatial variation of intensity of FM radio signals. Further, the availability of radio stations varies between geographical regions. Normally, a user of a mobile radio will search a frequency band for a desired radio station, using a scan or seek function of the mobile radio. The mobile radio will scan for a signal and once locked on to a station, will receive and decode a PS code of the station in order to establish a respective program station name. The mobile radio may then display the program station name.

Due to user interface constraints of a typical mobile radio user interface, this is the most commonly used technique for searching an FM radio band. Further, due to the presence of alternative frequencies for a particular station, it is possible that the particular station may be encountered more than once during a search as described above.

An FM radio receiver with RDS may only perform a search on the whole frequency spectrum of the FM radio band. This is undesirable as a user travelling from their home region to another region may wish to listen to a particular radio station they heard while last visiting the another region, the particular radio station having a particular frequency. The user may not be able to remember the particular frequency of the particular radio station, but may be able to remember the entirety of or a portion of the radio station name.

With known FM radio receivers, the user will be forced to scan the whole frequency spectrum of the FM radio band manually in order to find the particular radio station that they wish to listen to.

It is known for a mobile phone to be caused to download a channel list and to use the channel list to determine a frequency at which a desired programme is broadcast. However, it cannot be relied upon here that the radio station at a frequency has sufficient signal quality to provide a suitable user experience.

WO 2005/062507 discloses an RDS or RDBS receiver that scans through the FM radio band and detects radio stations that are broadcasting in the band. The receiver decodes RDS information including PS information for each of the detected stations and presents this information on a display 10, e.g. as a list of radio stations. To select a station, the user may input a search criterion, such as complete or partial PS name of a desired radio station. The receiver may perform a scan of the whole available spectrum, at each detected radio station receiving RDS data until the PS name has been decoded, and store the PS name along with information identifying the frequency at which the PS name was found. In this way, a user can quickly access a radio station having a programme name that includes text entered into a search request by the user.

It is an aim of embodiments of the present invention to solve or at least mitigate one or more of the problems described above.

SUMMARY OF THE INVENTION

According to a first aspect of the present invention there is provided a method comprising:
storing a table including plural programme identification codes and, for each programme identification code, a corresponding programme name;
extracting a programme identification code from supplementary information received along with a radio broadcast;
searching the table for the decoded programme identification code;
reading from the table a programme name that corresponds to the programme identification code; and
causing the programme name to be displayed.

The method may comprise using information about a geographical location of a terminal to restrict the search to only a part of the table. Alternatively, the method may comprise using information identifying a country in which a terminal is located and using the information to restrict the search to only a part of the table, or alternatively obtaining mobile country code information from a cellular modem, and using the mobile country code information to restrict the search to only a part of the table.

The method may comprise comprising updating the table with new programme identification codes and corresponding programme names.

The method may comprise updating the table with programme identification code and programme names received over a bidirectional data communications network.

Extracting the programme identification code from supplementary information received along with the radio broadcast may comprise decoding supplementary information from the radio broadcast for a predetermined time period and parsing the programme identification code from the supplementary information received during the predetermined time period. Here, the predetermined time period may be in the range 88 ms to 750 ms.

The invention also provides a computer program comprising machine readable instructions that when executed by computer apparatus control it to perform the method above.

A second aspect of the invention provides a computer readable medium having stored thereon machine readable instructions that when executed control it to perform:
storing a table including plural programme identification codes and, for each programme identification code, a corresponding programme name;
extracting a programme identification code from supplementary information received along with a radio broadcast;
searching the table for the decoded programme identification code;
reading from the table a programme name that corresponds to the programme identification code; and
causing the programme name to be displayed.

A third aspect of the invention provides apparatus comprising:
means for storing a table including plural programme identification codes and, for each programme identification code, a corresponding programme name;
means for extracting a programme identification code from supplementary information received along with a radio broadcast;
means for searching the table for the decoded programme identification code;
means for reading from the table a programme name that corresponds to the programme identification code; and
means for causing the programme name to be displayed.

A fourth aspect of the invention provides apparatus comprising:
one or more processors in communication with one or more memories, the one or memories having stored therein one or more computer programs that include computer code configured such as when executed to cause the processor to:
store a table including plural programme identification codes and, for each programme identification code, a corresponding programme name;
extract a programme identification code from supplementary information received along with a radio broadcast;
search the table for the decoded programme identification code;
read from the table a programme name that corresponds to the programme identification code; and
cause the programme name to be displayed.

DESCRIPTION OF THE DRAWINGS

The present invention will now be described by way of example, with reference to the accompanying drawings in which.

DESCRIPTION OF PREFERRED EMBODIMENTS OF THE PRESENT INVENTION

Figure 1:
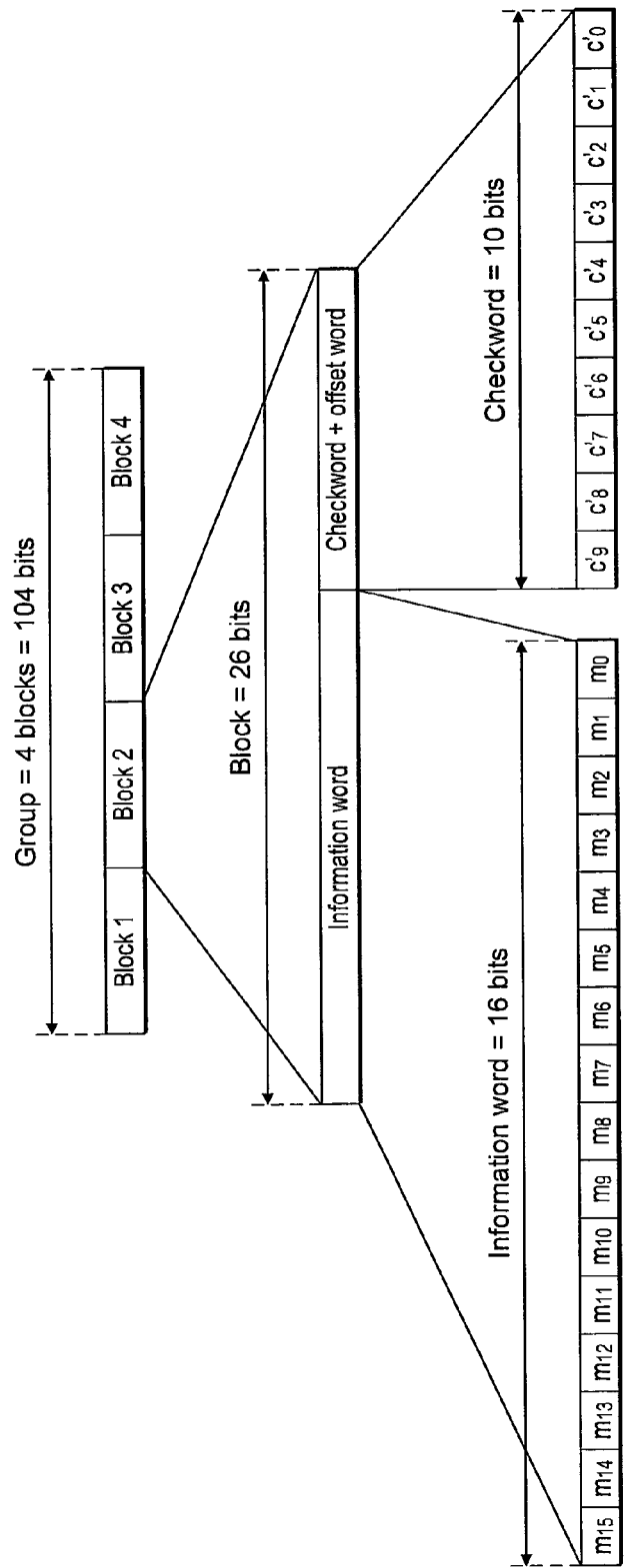
FIG. 1 shows a structure of RDS/RBDS baseband coding as is known in the art.
Figure 2:
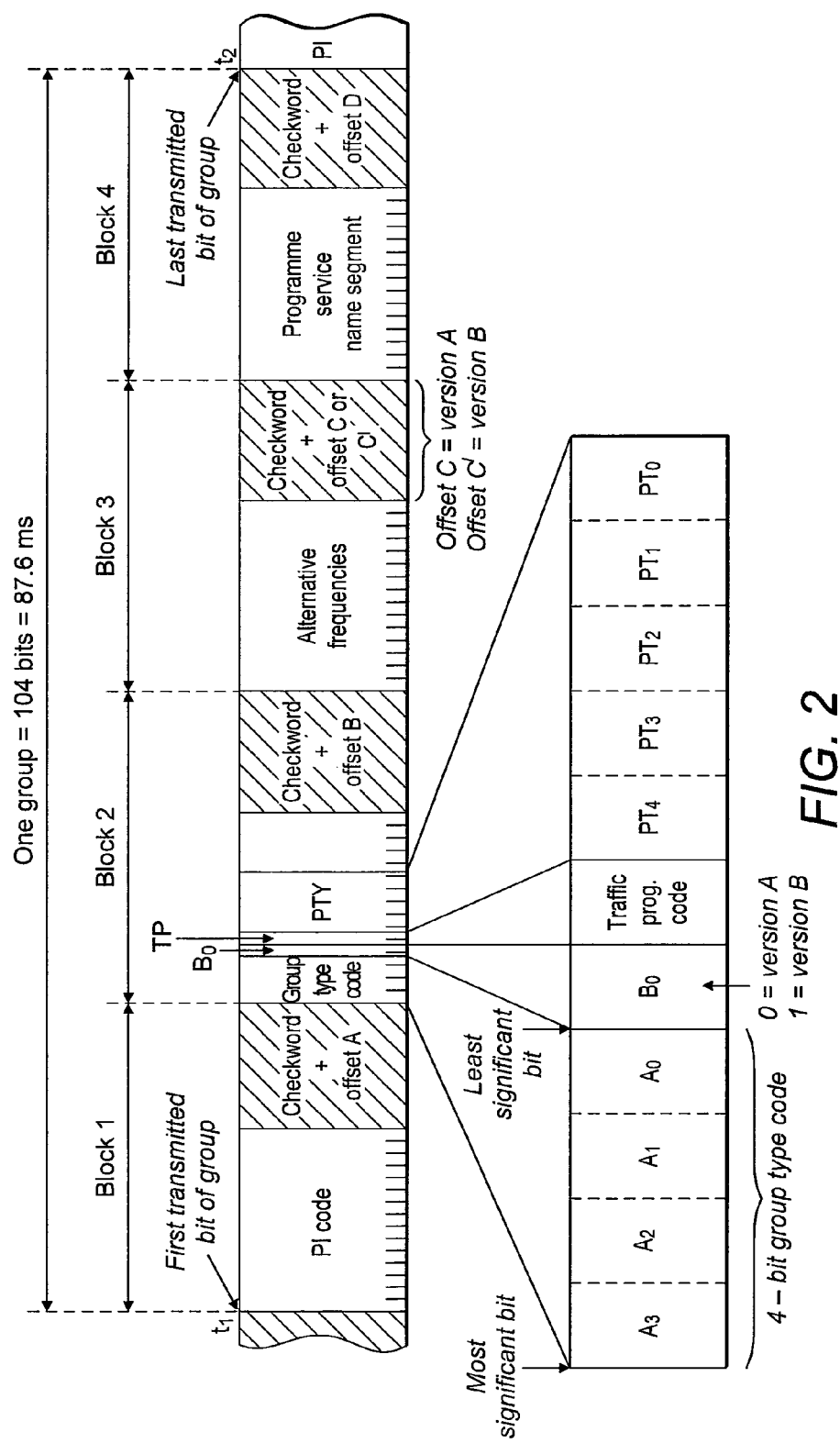
FIG. 2 shows a message format and addressing structure of the RDS signal, as is known in the art.
Figure 3:
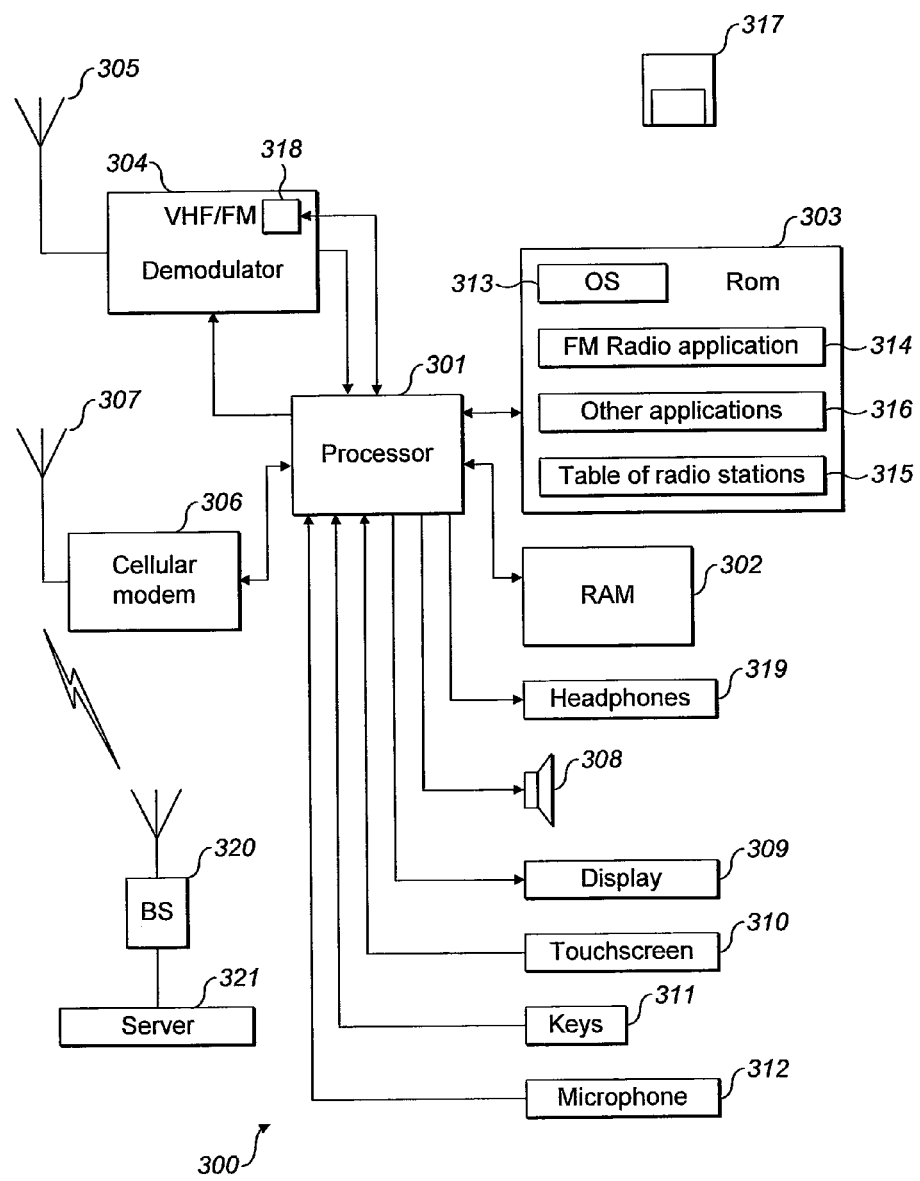
FIG. 3 is a schematic diagram illustrating components of a terminal according to embodiments of the present invention.

FIG. 3 is a schematic block diagram of a mobile terminal according to embodiments of the invention. The terminal 300 includes numerous components, only key ones of which will be discussed here.

The terminal 300 includes a processor 301, which is in bidirectional communication with volatile memory, such as RAM, 302 and with non-volatile memory, such as ROM, 303. The processor 301 also is in bidirectional communication with a VHF/FM demodulator 304, in which is included an RDS decoder 318. The VHF/FM demodulator 304 is coupled to an FM antenna 305. The VHF/FM demodulator 304 is a receiver only; it does not include any transmitter function. The processor is in bidirectional communication with the RDS decoder 318. The terminal 300 includes a battery 322, that is coupled to power the relevant hardware features of the terminal 300.

A cellular modem 306 also is in bidirectional communication with the processor 301. A cellular antenna 307 is connected to the cellular modem 306. The modem 306 is both a transmitter and a receiver. The cellular modem 306 is configured under control of the processor 301 to communicate in a bidirectional manner with a base station 320, which is connected to a server 321. The cellular modem 306 may be configured to operate according to a Universal Mobile Telephone System (UMTS) or Global System for Mobiles (GSM) standard, for instance. The terminal 300 may also include other transceivers (not shown) configured to allow communication according to other communication protocols, either standardised or proprietary.

The terminal 300 includes a number of user interface hardware features. Output features include a speaker 308 and a display 309. Input features include a touch screen input 310, one or more hardware keys 311 and a microphone 312. It will be appreciated that the touch screen 310 is optional and maybe omitted, particularly on medium- and low-end devices. A small number of hardware keys 311 may be used if a touch screen 310 is present in the terminal 300.

Optionally, headphones 319 are connected to the processor 301 of the terminal 300. Headphones allow a user of the terminal 300 to listen to audio produced by the terminal 300 to the exclusion of others. The antenna 305 connected to the VHF/FM demodulator 304 may be constituted by the headphones 319 or a lead that connects the terminal 300 to the headphones 319. Also, the headphones 319 may have integrated therewith one or more hardware keys or other user inputs that may supplement the touch screen 310 and the hardware keys 311. The headphones 319 may alternatively or in addition include a microphone that may supplement the microphone 312.

Stored in the ROM 303 is an operating system (OS) 313. The OS 313 includes software that controls overall operation of the terminal 300. In particular, it includes software that when executed by the processor 301, using the RAM 302, controls hardware components of the terminal 300 to provide certain functions.

Also stored in the ROM are an FM radio software application 314 and other software applications 316. These software applications 314, 316 are executed by the processor 301 using the operating system 313 and the RAM 302 so as to achieve certain functions. The FM radio application 314, for instance, provides a user interface with which a user may interact with the application and includes software that provides suitable control of the hardware components needed to cause the terminal 300 to provide the functions of an FM radio receiver. The other applications 316 are not important to this discussion so are not described in detail here.

Also stored in the ROM 303 is a table of radio stations 315. This is used by the FM radio application 314 to provide an improved user experience, as will be explained below. The table of radio stations 315 includes programme information (PI) codes. For each PI code, the table also includes a corresponding programme name.

The table 315 may also indicate one or more countries against each PI code stored in the table. The countries may be denoted by mobile country codes (MCCs). In some embodiments, the table is divided into a number of sections, each section relating to a different country. For instance, a first section of the table 315 may relate to radio stations that are receivable within Finland, a second section may relate to radio stations that are receivable within the United Kingdom, and other sections each relating to a different other country. Each section includes PI and PS data for radio stations that are able to be received in the associated country. The table may be divided into plural sections in any suitable way. For instance, a list of radio stations relating to one country may be separated from a list of radio stations relating to another country by a marker that identifies one or both countries. Alternatively, the table may be stored in a first block of memory with no physical distinction between PI and PS data relating to different countries (indeed the data may be mixed together) and a second block of memory in which locations in the first block of memory that relate to different countries are identified, for instance using pointers and block length fields.

The FM radio application 314 may be pre-installed in the terminal 300 by the manufacturer of the terminal or by a mobile network operator from whom the terminal is retailed. The FM radio application 314 may be updated periodically and/or in response to a user request for update.

The table of radio stations 315 may be pre-installed on the terminal 300 prior to first sale. Pre-installation may be performed by the manufacturer of the terminal or by a mobile network operator through with the terminal is retailed. Alternatively, the table of radio stations 315 may be downloaded from the server 321 using the cellular modem 306 or using some other communication transceiver (not shown) of the terminal 300.

The FM radio application 314 and/or the table of radio stations 315 may be provided to the terminal 300 by way of an intermediate carrier 317. The carrier may be any suitable type of media, for instance an optical storage device such as a CD or DVD, or a magnetic storage device such as a floppy disk, HDD etc. The FM radio application 314 and/or the table of radio stations 315 may be received from the carrier 317 by an intermediary, for instance a personal computing device accessible to the user of the terminal 300.

The table of radio stations 315 is periodically updated to reflect changes in the radio stations that are able to be received in various countries. For instance, updating may be provided by the FM radio application 314. Updating may occur periodically, for instance on a weekly or monthly basis, or may occur in response to a user instruction to update. Updating may involve adding new radio stations to the table 315. Updating may also involve deleting radio stations from the table 315.

Updating of the table of radio stations 315 and/or the FM radio applications 314 may involve the terminal 300 periodically and/or in response to a user input sending a request to the server 321 for an indication of whether updates are available. In response to receiving such a request, the server 321 replies with a message indicating whether or not one or more updates are available. The FM radio application 314 may provide the user with a message asking whether the user consents to the table of radio stations 315 and/or the FM radio application 314 being updated. The message may, for instance, be displayed on the display 309. In response to a positive response, or if the terminal 300 is configured so as to not require user acceptance of an update prior to executing an update, the terminal 300 sends a request to the server 321 for the updates to the table of radio stations 315 and/or the FM radio application 314. The server 321 replies with a response including the update, which is then received by the terminal 300. The update may be provided through the cellular modem 306, or through some other transceiver or interface (not shown). Once the terminal 300 has received the update and verified its integrity and authenticity, the terminal can install the update to the table of radio stations 315 and/or the FM radio application 314.

The table of radio stations 315 may be accessible only by the FM radio application 314. In this case, the table of radio stations 315 may be integrated with and into the FM radio application 314.

In some embodiments, the table of radio stations 315 includes an entry for every broadcast radio station that supports RDS data, RBDS data, or similar. The table of radio stations 315 may, in these embodiments, run to many hundreds, or thousands, of radio stations. Where a radio station may be received in two or more different countries and the table 315 includes one entry for each of the countries, the table of radio stations 315 may be many kB in size. Because radio stations change relatively infrequently, the amount of data needed to be communicated in order to update the table of radio stations 315 is expected to be of the order of a few kB every few weeks or so.

Figure 4:
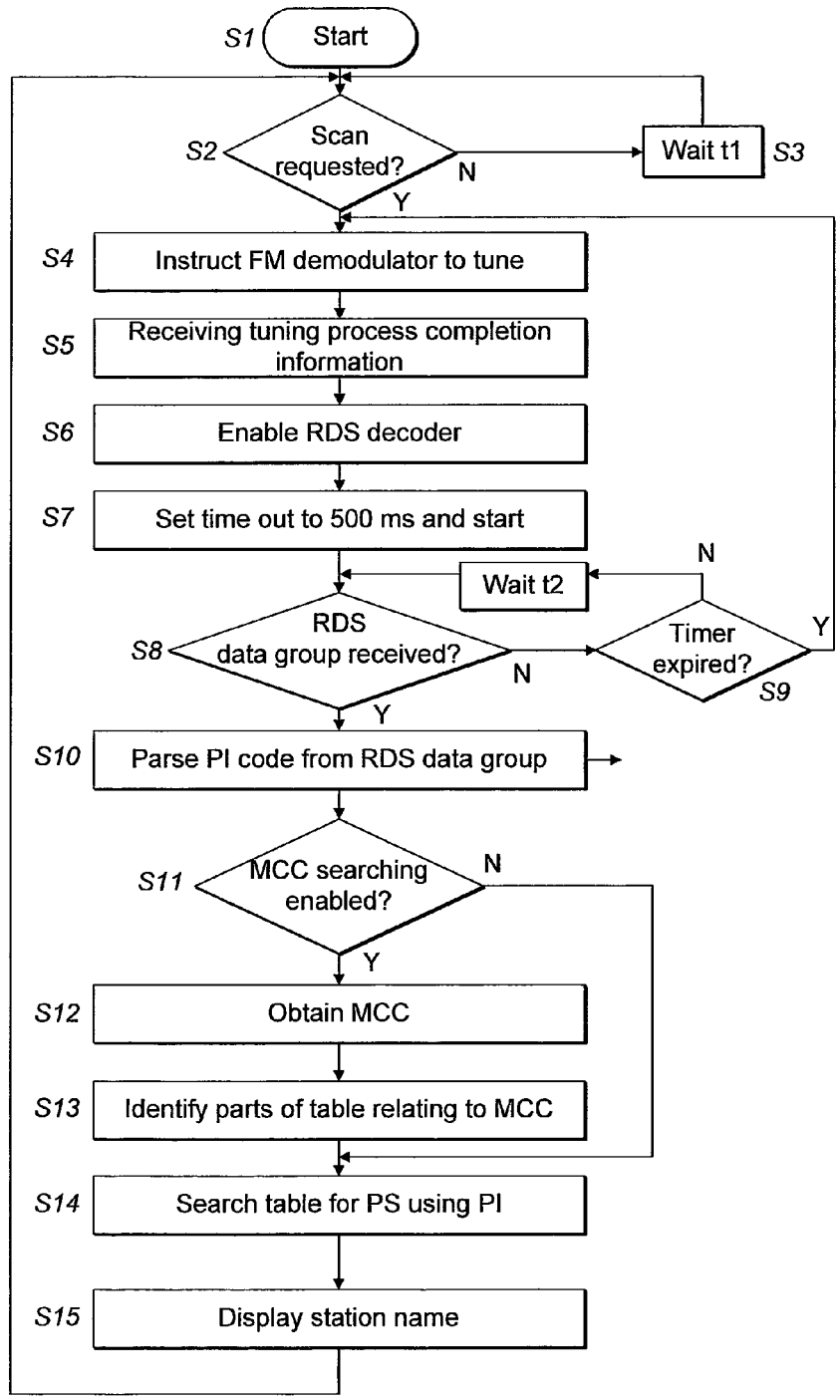
FIG. 4 is a flow diagram illustrating operation of the FIG. 3 terminal.

Operation of the terminal of FIG. 3 will now be described with reference FIG. 4. FIG. 4 is a flow diagram that shows a number of steps. These steps are executed by the processor 301 using the RAM 302 and other hardware of the terminal 300 under control of software that forms part of the FM radio application 314. It can be said that the FM radio application 314 includes instructions that when executed by the processor 301 control the processor, and thus the terminal 300, to perform the method shown in the flow chart.

The operation of FIG. 4 starts at step S1. At step S2 it is determined whether a scan has been requested. A scan may be requested by a user selecting an option in a user interface provided by the FM radio application 314. These input may be received using the touch screen 310, one or more of the keys 311 or a voice command input through the microphone 312. In the latter case, the FM radio application 314 may use a voice recognition application forming one of the other applications 316. The scan may be requested alternatively by the FM radio application 314 itself without any user input, or may alternatively be requested by the operating system 313. If a scan has not been requested, at step S3 the terminal 300 waits for a time period t1 before the operation proceeds again to S2.

Once a positive determination is made at step S2, at step S4 the processor 301 instructs the VHF/FM demodulator 304 to tune to the next available radio station. The next available radio station may be at a higher frequency or a lower frequency, a direction having been specified by the user or by the FM radio application 314 or by the OS 313.

At step S5, the processor 301 receives tuning process completion information from the VHF/FM demodulator 304. Once the VHF/FM demodulator 304 has tuned on to radio station, the information indicates that tuning is complete.

At step S6 the processor 301 enables the RDS decoder 318. This causes the RDS decoder 318 to decode RDS data that is modulated on to the signal received at the antenna 305 at the frequency to which VHF/FM demodulator 304 is tuned. At step S7, the processor sets a timer value and starts a timer. In this example, the timer is set to 500 ms. This timer value ensures that the RDS decoder is operational for a period that is sufficient to receive a group of data, thereby ensuring that one PI field should be received if the signal includes RDS data. In a perfect FM signal environment with the technology available today, successful PI code detection might happen within 150 ms. With RDS, the theoretical minimum time to transmit/receive a whole group is 87.6 ms. As well as depending on the FM signal reception quality, RDS decoder synchronization speed varies between different FM chip vendors. The timeout may be provided anywhere in the range 88 ms to 750 ms.

At step S9, it is determined whether an RDS data group has been received by the RDS decoder 318. On a negative determination, the operation proceeds to step S9, where it is determined whether the timer has expired. In response to a negative determination, at step S9 a wait of a small time period t2 is provided following which the operation proceeds again to step S8.

Once an RDS data group has been received, at step S10 the PI is code is parsed from the RDS data group. Whilst the RDS decoder 318 is enabled, it transfers decoded RDS data to the processor 301. Step S10 involves the processor 301 parsing the received data and extracting therefrom a PI code that is included in the RDS data.

If the timer expires before an RDS data group is decoded by the RDS decoder 318, it is determined that there is no RDS data provided as part of the radio station to which the VHF/FM demodulator 304 is tuned. In this case, the radio station is disregarded and the operation proceeds from step S9 to return to step S4. Here, the FM radio application 314 might be configured so as to display to the user through the display 309, that no RDS data or programme information for the currently tuned radio station.

Following the parsing of the PI code from RDS data group, it is determined at step S11 whether MCC search is enabled. This may be omitted if the FM radio application 314 is configured always to search using MCC or never to search using MCC. In the event of a positive determination, the MCC is obtained at step S12. This step may involve the processor 301 sending a command to the cellular modem in order to prompt the modem to send the MCC to the processor 301. In embodiments in which the cellular modem 306 is a UMTS or GSM modem, step S12 involves the processor 301 issuing a command "AT+COPS:" to the wireless modem 306. The MCC is then isolated from the response. At step S13, the parts of the table of radio stations 315 that are related to the MCC are identified.

Alternatively, the processor 301 may have obtained the MCC from the cellular modem 306 at an earlier time, for instance when registering with a cellular network after power-on of the terminal 300 or when handing-off between different networks.

The way in which step S13 is performed depends on the way in which the table of radio stations 315 denotes which radio stations are related to which countries.

After step S13, or in the event of a negative determination at step S11, the operation proceeds to step S14.

At step S14, the table of radio stations 315 is searched for the programme name or the radio station to which the VHF/FM demodulator 304 is currently tuned using the PI codes that was parsed from the RDS data at step S10. If step S11 yielded a positive result, step S14 is limited to the part(s) of the table 315 that are related to the relevant MCC.

At step S15 the programme name extracted from the table at step S14 is displayed to the user using the display 309.

It will be appreciated that the functions of the FM radio application 314 as described above with reference to FIG. 4 may provided by the FM radio application 314 at the time of installation in the terminal 300. Alternatively, an FM radio application 314 that is installed in a terminal that includes some or none of the ability to perform the method of FIG. 4 may be updated so as to take the form of an FM radio application 314 that is able to perform the method shown in FIG. 4.

Indeed, because no special hardware, above the hardware normally needed to provide an FM radio receiver, is required to execute the method of FIG. 4, embodiments of the invention are particularly susceptible to being provided by way of an update to FM radio application software that is already installed on terminals.

The FM radio application 314 may be configured to control the terminal to perform repeatedly the method of FIG. 4 across the whole of the relevant tuning range and to save in the ROM 303 a table (not shown) of information that relates tuning frequencies to programme name information. Using this table, the FM radio application 314 can provide a programme name search function to the user. Using this table, the FM radio application 314 also can allow the user to cycle through programme names of available radio stations without requiring the VHF/FM demodulator 304 to tune to those radio stations. However, the information stored in the table may quickly become out of date if, for instance, the terminal 300 is moved to a different location. However, because of the features described with reference to FIG. 4, the process of scanning the relevant radio spectrum is considerably shorter than the process required in the prior art. This means that the process requires fewer resources, including battery power, of the terminal 300, which may allow a full scan to be performed relatively frequently without being to the detriment of battery life of the terminal 300.

Where the FM radio application 314 is configured to perform a full scan, the steps of the method of FIG. 4 may not necessarily be performed in a purely sequential manner. For instance, once the timer has expired at step S8, by which time any RDS data modulated onto the signal at the tuned frequency should have been received, the FM radio application 314 may control the VHF/FM demodulator 304 to tune into the next frequency and in parallel to search the table of radio stations 315 for the programme name relating to the tuned radio stations. This can further reduce the time needed to perform a full scan.

Having the table 315 terminal divided into plural sections, each section relating to a different country as may be identified in any suitable manner, provides advantages in terms of reduced search time. In a UMTS or GSM transceiver system, the resources used in a PS information search using this table 315 can be reduced as follows. Firstly, the processor 301 sends the command AT+COPS: to the GSM/UMTS wireless modem 306. In response, the modem 306 sends a message to the controller that includes a mobile country code (MCC). The processor 301 receives this response and isolates the MCC. The processor 301 then uses the MCC to limit the search of the table. For instance, if the MCC is 234 or 235, the processor 301 searches only the PI data that relates to radio stations that are receivable in the United Kingdom. If the MCC is 244, the processor 301 searches the for PI data that relates to radio stations that are receivable in Finland. It will be appreciated that radio stations that are receivable in a given country may include some radio stations that are broadcast in neighbouring countries, where a transmitter station has an effective range that is greater than the shortest distance between the transmitter and the nearest part of the border between the two neighbouring countries. For very small or narrow countries, the radio stations that are receivable may include radio stations that are broadcast in non-adjacent countries.

Using the features described above, the terminal can determine a programme name of a radio station to which the terminal is tuned significantly more quickly than can occur in the prior art. In turn, this allows the terminal to display the programme name to the user significantly more quickly. Whether the user is searching for a particular radio station or whether the user is just browsing radio stations looking for something of interest, providing the programme name of the tuned station more quickly allows the user more quickly to find the desired radio station or a radio station of interest. Moreover, this does not rely on correct frequency information being stored within the terminal, which is particularly useful in situations in which the terminal is sufficiently likely to have moved from a location where the frequency information is valid, such as occurs when the terminal moves large distances of moves in a mountainous or hilly area in which topography can limit reliable radio reception. These advantages are achieved at the expense of the terminal needing locally to store a table of information relating programme information data to programme name data. Moreover, this table may be of significant size. Additionally, in order to maintain the table with current station information, updates may be applied from time-to-time. Updating the table requires radio and battery resources of the terminal. Moreover, the transmission of data over a cellular network may incur cost for the user.

It will be appreciated that the method described to respect to FIG. 4 results in the programme name for the tuned radio station being provided to the user significantly more quickly than is possible where the PS data needs to be decoded from the received RDS data. Thus, the user can determine at an earlier stage whether the tuned radio station is a radio station in which they are interested. If the tuned radio station is of interest, no further searching needs to be performed. In this case, the user may indicate to the FM radio application 314 that no further searching is required, for instance by cancelling an auto-scan function or alternatively merely by refraining from requesting another scan. If the tuned radio station is not of interest to the user, as can be determined from the displayed programme name, the user may instruct the FM radio application 314 to scan for another radio station, for instance using the touch screen 310 or one of the hardware keys 311, or may refrain from cancelling an auto-scan function, thereby causing the FM radio application 314 to control the VHF/FM demodulator 314 to tune to the next radio station a predetermined time after the programme name has been displayed.

In addition, using the features described above, the terminal can determine a programme name of a radio station to which the terminal is tuned even when programme name information is not broadcast as part of the RDS data. This occurs when the fields reserved for PS data are used to provide text such that an FM receiver would normally display it in scrolling mode. This occurs also when the fields reserved for PS data are used in static mode for delivering information other than programme name, for instance track name or advertisements, either continually or intermittently.

In addition to reducing the time taken to provide the programme name for a tuned radio station in the case of good FM signal reception environment, the improvement in performance is greater in the cases of relatively poor signal reception environments where the RDS data stream may be discontinuous. This is because the PI code needs only to be received correctly once the during the period of the timer set in step S7 of FIG. 4, whereas if the programme name is to be decoded from the PS fields of the received RDS data every character of the programme name needs to be correctly decoded.

Various alternatives are within the scope of the invention, including the use of GPS-derived location to determine PI data with which to limit the search of the table. However, the quantity of data that needs to be included in a table that accommodates such can be significant. The use of MCC data provides a good compromise between table size (in terms of the amount of data stored) and resources used in an average search. Additionally, MCC data is readily available at relatively little resource cost and without requiring expensive hardware. This allows the advantageous features to be implemented in medium- and low-end devices that do not necessarily include GPS receivers and the like.

Embodiments of the present invention have been described in the context of FM radio and the RDS and RBDS standards. However, it should be appreciated that embodiments of the present invention can be used with any other type of information system featuring the broadcast of supplementary data with a radio station. This may, for example, be the SWIFT system defined in standard ETS-300751 issued by the European Telecommunications Standards Institute, or the DARC (Data Audio Radio Channel) standard developed by the Japanese firm NHK Science and Technical Research Laboratories. Alternatively, this may take the form of the inclusion of supplementary data applied to amplitude modulation (AM) broadcast stations. Reference is made above to particular versions of the RDS and RDBS standards, it should be understood that embodiments of the present invention are relevant to these particular standards as well as future editions of these standards. The invention is applicable also to digital encoded audio or visual transitions that use data structures similar to the RDS/RBDS encoding systems.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method, comprising:
   storing a table including plural programme identification codes and, for each programme identification code, a corresponding programme name;
   extracting a programme identification code from a supplementary information received along with a radio broadcast;
   searching the table for the extracted programme identification code;
   reading from the table a programme name that corresponds to the extracted programme identification code; and
   causing the programme name to be displayed.

2. A method as claimed in claim 1, further comprising using information about a geographical location of a terminal to restrict the search to only a part of the table.

3. A method as claimed in claim 1, further comprising using information identifying a country in which a terminal is located and using the information to restrict the search to only a part of the table.

4. A method as claimed in claim 1, further comprising obtaining a mobile country code information from a cellular modem, and using the mobile country code information to restrict the search to only a part of the table.

5. A method as claimed in claim 1 further comprising updating the table with revised programme identification codes and corresponding programme names.

6. A method as claimed in claim 1 further comprising a revision to the table with programme identification code and programme names received over a bidirectional data communications network.

7. A method as claimed in 1 wherein the extracted the programme identification code from supplementary information received along with the radio broadcast comprises the extracted supplementary information from the radio broadcast for a predetermined time period and parsed the programme identification code from the supplementary information received during the predetermined time period.

8. A method as claimed in claim 7, wherein the predetermined time period is in the range 88 ms to 750 ms.

9. A computer program comprising machine readable instructions that when executed by computer apparatus control it to perform the method of claim 7.

10. A tangible computer readable medium having stored thereon machine readable instructions that when executed control it to perform:
    storing a table including plural programme identification codes and, for each programme identification code, a corresponding programme name;
    extracting a programme identification code from a supplementary information received along with a radio broadcast;
    searching the table for the extracted programme identification code;
    reading from the table a programme name that corresponds to the programme identification code; and
    causing the programme name to be displayed.

11. Apparatus comprising:
    a memory configured to store a table including plural programme identification codes and, for each programme identification code, a corresponding programme name;
    a process configured to extract a programme identification code from supplementary information received along with a radio broadcast;
    a processor configured to search the table for the decoded programme identification code;
    a processor configured to read from the table a programme name that corresponds to the programme identification code; and
    a processor configured to cause the programme name to be displayed.

12. Apparatus as claimed in claim 11, further comprising processor configured to use information about a geographical location of the terminal to restrict the search to only a part of the table.

13. Apparatus as claimed in claim 11, further comprising a processor configured to use information identifying a country in which the terminal is located and use the information to restrict the search to only a part of the table.

14. Apparatus as claimed in claim 11, further comprising a processor configured to obtain mobile country code information from a cellular modem, and use the mobile country code information to restrict the search to only a part of the table.

15. Apparatus as claimed in claim 11, further comprising a processor configured to update the table with new programme identification codes and corresponding programme names.

16. Apparatus as claimed in claim 11, further comprising a processor configured to update the table with programme identification code and programme names received over a bidirectional data communications network.

17. Apparatus as claimed in claim 11, wherein the a processor configured to extract the programme identification code from supplementary information received along with the radio broadcast is further configured to extract supplementary information from the radio broadcast for a predetermined time period and parse the programme identification code from the supplementary information received during the predetermined time period.

18. Apparatus as claimed in claim 17, wherein the predetermined time period is in the range 88 ms to 750 ms.

19. Apparatus comprising:
    one or more processors in communication with one or more memories, the one or memories having stored therein one or more computer programs that include computer code configured such as when executed to cause the processor to:
    store a table including plural programme identification codes and, for each programme identification code, a corresponding programme name;

extract a programme identification code from supplementary information received along with a radio broadcast;
search the table for the decoded programme identification code;
read from the table a programme name that corresponds to the programme identification code; and
cause the programme name to be displayed.

\* \* \* \* \*